(12) United States Patent
Eisl et al.

(10) Patent No.: US 11,685,961 B2
(45) Date of Patent: Jun. 27, 2023

(54) METHOD FOR DIRECT REDUCTION IN A FLUIDIZED BED

(71) Applicant: Primetals Technologies Austria GmbH, Linz (AT)

(72) Inventors: Roland Eisl, Regau (AT); Bernhard Hiebl, Wilhering (AT); Hanspeter Ofner, Pucking (AT); Norbert Rein, Vienna (AT); Johann Wurm, Bad Zell (AT)

(73) Assignee: Primetals Technologies Austria GmbH, Linz (AT)

( * ) Notice: Subject to any disclaimer, the term of this patent is extended or adjusted under 35 U.S.C. 154(b) by 0 days.

(21) Appl. No.: 17/438,529

(22) PCT Filed: Mar. 12, 2020

(86) PCT No.: PCT/EP2020/056580
§ 371 (c)(1),
(2) Date: Sep. 13, 2021

(87) PCT Pub. No.: WO2020/187672
PCT Pub. Date: Sep. 24, 2020

(65) Prior Publication Data
US 2022/0145412 A1    May 12, 2022

(30) Foreign Application Priority Data

Mar. 15, 2019  (EP) .................................... 19163059

(51) Int. Cl.
*C21B 13/00*    (2006.01)
*F27B 15/18*    (2006.01)
*F27B 15/10*    (2006.01)

(52) U.S. Cl.
CPC ...... *C21B 13/0033* (2013.01); *C21B 13/0073* (2013.01); *F27B 15/10* (2013.01); *F27B 15/18* (2013.01); *F27M 2003/165* (2013.01)

(58) Field of Classification Search
CPC . C21B 13/0033; C21B 13/0073; F27B 15/10; F27B 15/18
(Continued)

(56) References Cited

U.S. PATENT DOCUMENTS 3,022,156 A * 2/1962 Eastman ............. C21B 13/0033
                                                    75/10.58
3,140,940 A    7/1964 Keith
(Continued)

FOREIGN PATENT DOCUMENTS

AU    2001262027 B2    3/2006
CA       2388847 A1    5/2001
(Continued)

OTHER PUBLICATIONS

International Search Report and Written Opinion received in International Application No. PCT/EP2020/056580 dated Jun. 4, 2020, pp. 17.
(Continued)

*Primary Examiner* — Scott R Kastler
*Assistant Examiner* — Michael Aboagye
(74) *Attorney, Agent, or Firm* — Liang & Hennessey LLP; Brian Hennessey

(57) ABSTRACT

The invention relates to a method for the direct reduction of oxidic iron carrier particles to a reduction product in a fluidized bed through which a reduction gas containing 30-100 mol % hydrogen $H_2$ flows in crossflow. At least 90% by mass of oxidic iron carrier particles introduced into the fluidized bed have a particle size of less than or equal to 200 micrometers. The superficial velocity U of the reduction gas
(Continued)

flowing through the fluidized bed is set between 0.05 m/s and 1 m/s such that, for the particle size d equal to $d_{30}$ of the oxidic iron carrier particles introduced into the fluidized bed, it is above the theoretical suspension velocity $U_t$ and is less than or equal to $U_{max}$.

19 Claims, 3 Drawing Sheets

(58) Field of Classification Search
USPC .......................................... 75/444, 450, 451
See application file for complete search history.

(56) References Cited

U.S. PATENT DOCUMENTS

| | | | | |
|---|---|---|---|---|
| 3,551,138 | A | * | 12/1970 | Brown ................ C21B 13/0033 75/451 |
| 3,607,217 | A | * | 9/1971 | Metrailer ................ C10B 55/10 75/754 |
| 3,776,533 | A | | 12/1973 | Vlnaty |
| 3,840,363 | A | * | 10/1974 | Engle ................ C21B 13/0033 266/172 |
| 3,948,645 | A | * | 4/1976 | Elvander ................ C10B 19/00 75/10.17 |
| 5,876,679 | A | | 3/1999 | D'Acierno et al. |
| 6,241,801 | B1 | | 6/2001 | Kepplinger et al. |
| 9,512,496 | B2 | * | 12/2016 | Hauzenberger ..... C21B 13/0013 |
| 2006/0230880 | A1 | | 10/2006 | Hirsch et al. |

FOREIGN PATENT DOCUMENTS

| | | |
|---|---|---|
| CN | 101445851 A | 6/2009 |
| DE | 2420640 A1 | 11/1974 |
| FR | 2227047 A1 | 11/1974 |
| GB | 1165827 A | 10/1969 |
| JP | S5026763 A | 3/1975 |
| JP | S5075977 A | 6/1975 |
| JP | 2501662 B2 | 5/1996 |
| JP | 2000510908 A | 8/2000 |
| JP | 2008060215 A | 3/2008 |
| KR | 19980034483 A | 8/1998 |
| KR | 20030052393 A | 6/2003 |
| RU | 2131471 C1 | 6/1999 |
| RU | 2136763 C1 | 9/1999 |
| RU | 2471000 C1 | 12/2012 |

OTHER PUBLICATIONS

International Search Report and Written Opinion received in International Application No. PCT/EP2020/056580 dated Jun. 4, 2020, p. 18.
Japanese Office Action received in Japanese Application No. 2021-555528 dated Mar. 28, 2022, pp. 1-7.
Korean Office Action received in Korean Application No. 10-2021-7029551 dated Apr. 21, 2022, pp. 1-3.
Chinese Office Action received in Chinese Application No. 202080021383.4 dated Apr. 18, 2022, pp. 1-6.
Russian Office Action received in Russian Application No. 2021126934 dated May 17, 2022, pp. 1-19.
Kazakhstan Office Action received in Kazakhstan Application No. 2021/0542.1 dated Oct. 10, 2022, pp. 1-13.

* cited by examiner

METHOD FOR DIRECT REDUCTION IN A FLUIDIZED BED

CROSS-REFERENCE TO RELATED APPLICATIONS

The present application is a national phase application of PCT Application No. PCT/EP2020/056580, filed Mar. 12, 2020, entitled "METHOD FOR DIRECT REDUCTION IN A FLUIDIZED BED", which claims the benefit of European Patent Application No. 19163059.9, filed Mar. 15, 2019, each of which is incorporated by reference in its entirety.

BACKGROUND OF THE INVENTION

1. Field of the Invention

The application relates to a process of direct reduction of oxidic iron-bearing particles to a reduction product in a fluidized bed through which a reduction gas containing 30-100 mol % of hydrogen $H_2$ flows in crosscurrent.

2. Description of the Related Art

A wide variety of different processes is known for direct reduction of oxidic iron-bearing particles, for example iron ore, by means of a fluid bed through which reduction gas flows. The following examples have been employed commercially to date: FIOR, FINMET, FINEX, CIRCORED.

In the context of this application, the term "iron ore" includes both ores that are sent directly to the reduction process after extraction from a mine and ores that are supplied to the reduction process only after processing steps or other pretreatments that follow extraction. In any case, oxidized iron is present therein.

In the fluid bed processes used for iron ore reduction, reduction gas flow is counter to gravity through solid-state particles—i.e. the oxidic iron-bearing particles, for example bulk iron ore material. This puts the solid-state particles in a fluidized, i.e. suspended, state, and the volume that flows through effectively assumes the flow propensity of a fluid, which is also called fluidizing. Fluidization is also utilized for transport of solids, for example in pneumatic conveyors with movement of solids and gas in crosscurrent.

The development of a fluid bed can be divided into various stages according to the intensity of fluidization, for example minimum/smooth/bubbling/turbulent. Proceeding from what is called a fixed bed state, in which the reduction gas is flowing through the bulk material without fluidizing it. With rising gas velocity, fluidization commences with the minimum fluidization state and then transitions to the state of smooth fluidization as the gas velocity rises further. The fluidization state present in a fluid bed depends on gas velocity, gas density and gas viscosity, and on the particle mass and density, shape, particle volume and the grain size distribution of the solid-state particles used. The term "fluid bed" can be equated with the term "fluidized bed"; the two terms are used synonymously in the present application. At the fluidization point, there is a transition from a fixed bed to a fluidized bed.

In principle, in a fluid bed, on account of the high exchange area present between the solid state and gas, comparatively high mass and heat transfer rates are achieved. This correspondingly results in high specific conversion rates in the reduction reactions.

The industrially and economically achievable level of metallization of the reduction products depends on many factors.

For reduction of a molar amount of iron oxide to metallic iron, it is necessary to provide at least the amount of reduction gas required in stoichiometric terms for the reduction reaction. The reduction gas volume that actually has to be transported through the solid-state matter is determined by the thermodynamic equilibrium position between the various oxidation states of the ore and the reduction gas. This equilibrium position can be influenced by the temperature.

With a mode of operation under elevated pressure, it is possible to increase the mass flow rate of reduction gas, but there are disadvantageously higher demands on the design and safety technology of the reduction unit.

A disadvantage that arises at high temperatures is the tendency of the solid-state particles to agglomerate—also called sticking—which has an unfavorable effect on the operation of the fluid bed, for example through defluidization.

With a mode of operation at elevated gas velocity, it is possible to increase the mass flow rate of reduction gas.

In the context of the present application, the term "gas velocity" means superficial velocity.

The maximum practically usable gas velocity in the case of a particular bulk solid-state particulate material—and hence the maximum gas volume transportable through the fluid bed per unit area per unit time—is calculated from that gas velocity above which a proportion of the solid-state particles that is no longer negligible in respect of the process is discharged from the fluid bed.

The state where the gas velocity corresponds to the settling velocity of the solid-state particles is called the discharge point. The gas velocity of the reduction gas at the discharge point is equal to the settling velocity of the solid-state particles and is called fluidization velocity. When the gas velocity is increased further, the solid-state particles are entrained by the gas and discharged from the fluid bed counter to gravity. Solid-state particles discharged from the fluid bed are no longer involved in the reactions in the fluid bed, which reduces the efficiency of a fluid bed-based reduction process.

The smaller the grain size of solid-state particles, the lower the fluidization velocity. Low gas velocities result in a need for high reactor areas to ensure a certain throughput for small grain sizes. However, increasing reactor areas has disadvantages such as high construction complexity, high operating costs, higher propensity to faults. Large reactor areas are counteracted in the case of technologies currently employed, for example by means of measures that are complex in terms of safety technology and operation—for example significantly increased pressure, operation with a turbulent fluid bed including recycling of discharged solids.

In the case of processing of oxidic iron-bearing particles having high proportions of small grain sizes, the problems that arise are therefore low usable gas velocities and the associated need for high reactor areas.

As a measure for increasing the discharge rate, small solid particles are also often agglomerated before they are sent to a reduction in the fluid bed.

SUMMARY OF THE INVENTION

It is an object of the present invention to provide processes and devices which, with a comparatively low level of safety demands and low complexity of construction and operation, permit utilization of oxidic iron-bearing particles having at least 90% by mass with a grain size of not more than 200 micrometers for direct reduction in a fluidized bed without a prior agglomeration step.

This object is achieved by a process of direct reduction of oxidic iron-bearing particles to a reduction product in a fluidized bed through which a reduction gas containing 30-100 mol % of hydrogen $H_2$ flows in crosscurrent, characterized in that the oxidic iron-bearing particles introduced into the fluidized bed have a grain size of not more than 200 micrometers to an extent of at least 90% by mass, and in that the superficial velocity U of the reduction gas flowing through the fluidized bed is set between 0.05 m/s and 1 m/s such that it is above the theoretical fluidization velocity $U_t$ and not more than $U_{max}$ for the grain size $d=d_{30}$ of the oxidic iron-bearing particles introduced into the fluidized bed.

The $d_{30}$ value for grain size—also called particle size in this application—of the oxidic iron-bearing particles introduced indicates that 30% by mass of the oxidic iron-bearing particles have a particle size of not more than $d_{30}$—i.e. 70% by mass is higher.

The theoretically predicted value $U_t$ for a grain size d is calculated from:

$$U_t = \sqrt{\left(\frac{4}{3} * \frac{(\rho p - \rho g)}{\rho g} * \frac{d * g}{C_w}\right)}$$

with $C_w = \frac{24}{Re} + \frac{4}{\sqrt{Re}} + 0.4$ and with $$Re = \frac{\rho g * U_t * d}{\mu}$$

$U_{max}$ is calculated from the correlation actually found between particle size and fluidization velocity for a particle size $d=d_{30}$:

$$U_{max} = (40000*d)^{2.78}$$

$U_t$ theoretical fluidization velocity [m/s]
$U_{max}$ maximum superficial velocity for $d=d_{30}$ [m/s]
ρp particle density [kg/m³]
μg density of the reduction gas [kg/m³]; for the state of operation
d grain size [m]
g acceleration due to gravity [m/s²]
μ dynamic viscosity [kg/(m*s)]
cw coefficient of resistance
Re Reynolds number The theory of prevailing teaching, according to the relationship already mentioned for $U_t$, would suggest that, with establishment of the superficial velocity U above the theoretical fluidization velocity $U_t$ applicable to the particle size $d_{30}$ of the oxidic iron-bearing particles introduced into the fluidized bed, more than 30% by mass is discharged.

Surprisingly, for the oxidic iron-bearing particles having a grain size of at least 90% by mass of not more than 200 micrometers introduced into the fluidized bed, it has been found that less is discharged in the process regime of the invention even though the $U_t$ for particle size $d=d_{30}$ is exceeded, provided that the superficial velocity U is not more than $U_{max}$ for $d=d_{30}$. Accordingly, for a given maximum acceptable discharge, it is possible to work with higher gas velocities than expected from theory. The superficial velocity U is preferably adjusted such that not more than 30% by mass is discharged—i.e. $U_{max}$ for $d=d_{30}$, more preferably such that not more than 25% by mass is discharged, even more preferably such that not more than 20% by mass is discharged, and extremely preferably such that not more than 15% by mass is discharged.

According to the invention, the reduction gas is guided through the fluid bed at a velocity of more than 0.05 m/s, preferably more than 0.1 m/s. With the parameters chosen in accordance with the invention, the oxidic iron-bearing particles in the fluidized bed formed, through which the reduction gas flows in crosscurrent, show different behavior than predicted according to the prevailing teaching—according to the relationship for $U_t$ already given. Below a velocity of 0.05 m/s, the maintenance of the fluidized bed is difficult to control, and the ratio of complexity of the process regime to achievable throughput is low. The extent to which the velocity actually chosen is above 0.05 m/s, preferably above 0.1 m/s, depends on the extent of discharge from the fluidized bed permitted by the operator. On the one hand, a higher velocity is desirable because, as a result, the reactor area needed for a desired throughput may be smaller. On the other hand, discharge increases with rising velocity, and the discharge of particles from the fluid bed reduces the achievable throughput. Therefore, the upper limit for the superficial velocity is 1 m/s.

Particular preference is given to performing the process within a velocity range from 0.05 m/s to 0.5 m/s, because throughput and the degree of discharge are then in a favorable ratio.

According to the invention, a fluidized bed is used in a state of fluidization in the region of the minimum; no circulating fluid bed is used.

The amount discharged relates to the period of introduction of oxidic iron-bearing particles into the fluidized bed until the withdrawal of the reaction product formed therefrom—i.e. to the dwell time of the particles in the fluidized bed.

With regard to general matters relating to reduction in a fluid bed or a fluidized bed, reference is made to the introductory text relating to the prior art. "A" should be understood to mean the indefinite article in the expression "in a fluidized bed".

The oxidic iron-bearing particles may be iron ore or else correspondingly fine-grain material containing iron oxides, for example blast furnace dust, sintering dust, pelletizing dust or other recirculation streams from an iron- or steelworks; they may also be mixtures thereof. According to the invention, the term "iron ore" means either ores that are sent directly to the reduction process after extraction from a mine or ores that are sent to the reduction process only after processing steps that follow extraction—for example flotation—or other pretreatments. In any case, oxidized iron is present therein.

Grain size range and grain size distribution result from the operation of the industrial scale production of the starting material. They are measured by sieve analysis. A material of oxidic iron-bearing particles having a grain size of not more than 200 micrometers to an extent of at least 90% by mass—and generally present with more than 50% by mass smaller than 50 micrometers μm—is, for example, pellet feed. An analytical process according to ISO13320 in the March 2019 version is employed.

The reduction gas may consist of hydrogen $H_2$ or be a mixture of hydrogen with one or more further gases. For example, it is possible to use hydrogen of technical grade purity. The reducing agent is thus at least hydrogen $H_2$. The further gases may themselves also have a reducing effect on oxidic iron-bearing particles, i.e. provide further reducing agents in addition to hydrogen $H_2$. A further gas may, for example, be carbon monoxide CO. The hydrogen may come, for example, from electrolysis, preferably by means of green energy, or from reforming of natural gas.

The kinetics of reduction of hydrogen $H_2$ with iron oxides are fundamentally more favorable, and particularly at lower temperatures, than for other gases, for example compared to carbon monoxide CO. Therefore, the reduction gas, according to the invention, should contain at least 30 mol % of hydrogen $H_2$, in order still to ensure economically usable reduction kinetics within the temperature range of the invention which is preferred owing to the risk of sticking. By comparison with a reduction gas having a lower hydrogen content, as a result, less fresh reduction gas has to be used in order to achieve a particular level of metallization. By comparison with a reduction gas having a lower hydrogen content, as a result, it may be necessary to recirculate less spent reduction gas exiting from the fluidized bed after processing for the purpose of utilization of the unused reducing agent present therein.

The reduction gas is guided through the fluidized bed from the bottom upwards, counter to gravity. According to the invention, the process is conducted in crosscurrent. The particles—oxidic iron-bearing particles, intermediate, reaction product—are moved within the fluidized bed so as to result in a crossflow of the reduction gas and the particles. In the process, the oxidic iron-bearing particles are introduced into the fluidized bed, and the reduction product is withdrawn from the fluidized bed. The movement from the input site to the withdrawal site in crosscurrent to the reduction gas that flows counter to gravity is essentially horizontal.

In the case of a fluidized bed in crosscurrent—executed, for example, in a fluidized bed trough—direct reduction is effected over the length—preferably in an approximately horizontal alignment—of the fluidized bed from an input site to a withdrawal site. There is thus a change in the quality—for example the ratios of the iron oxide species magnetite, hematite or wuestite, or the porosity of the particles—of the iron oxide present over the length of the fluidized bed. Backmixing, as can occur anywhere in a fluid bed even to the extent of homogeneity, is undesirable because, as a result, for example, less reduced material would be able to move from the input site to the withdrawal site, or the particle dwell time would become inhomogeneous.

The reduction product—for example DRI iron sponge with a metallization level exceeding 90%—has a higher metallization level than the oxidic iron-bearing particles. The metallization level is defined as the ratio of the parts by mass of iron in metallic form to the total iron present in the reduction product:

Metallization level=proportion by mass (Fe metallic)/proportion by mass (Fe total)

According to the process regime, the metallization level of the reaction product may be different. According to the end use of the reaction product, a higher or lower metallization level may be desirable—for example, in the case of utilization of the process of the invention for preliminary reduction for the purpose of final reduction in some other way, it may also be below that of DRI iron sponge, for example in the order of magnitude of 60%.

The length of time for which particles have to remain in the fluidized bed for conversion to the desired reaction product—called particle dwell time—depends on the kinetics of the reduction reaction that has to proceed. This is dependent in turn on a multitude of factors, such as the composition of the reduction gas, the velocity of the reduction gas, the type of oxidic iron-bearing particles—for example according to whether magnetite, hematite or wuestite has to be reduced, or the porosity of the particles to be reduced.

The particle dwell time corresponds to the period of time needed by the particles to flow from the input site to the withdrawal site—introduced as oxidic iron-bearing particles, withdrawn as reduction product particles. The length of the particle dwell time depends, for example, on the distance of the input site from the withdrawal site and on the bed height of the fluidized bed.

In the process regime of the invention in crosscurrent, which is effected, for example, in an essentially horizontal fluidized bed with preferably continuous addition of oxidic iron-bearing particles and preferably continuous withdrawal of the reduction product, the particle dwell time can be easily regulated by the bed height established, for example via weirs. The particle dwell time can also be regulated via the choice of distance between input site and withdrawal site.

"Essentially horizontal" includes a variance from the horizontal of up to 10°, preferably includes a variance of up to 5°, and more preferably includes a variance of up to 2°. In the case of excessively high variance from the horizontal, the bed height in the fluidized bed becomes inhomogeneous over the longitudinal extent of the fluidized bed from the input site to the withdrawal site, which has an adverse effect on the controllability of the particle dwell time.

The reduction gas remains in the fluidized bed for the duration of the gas dwell time. If the gas dwell time is too short for the establishment of approximate equilibrium of the reduction reaction, a relatively large amount of unused reducing agent will leave the fluidized bed.

The proportion of unused reducing agent in the gas leaving the fluidized bed—called spent reduction gas—can be influenced via the bed height.

A process regime in crosscurrent makes it easy to match the demands of particle dwell time and gas dwell time.

By the process of the invention, it is possible to reduce iron-bearing particles present in accordance with the invention in an economically viable manner without prior agglomeration. By comparison to known processes, it is also possible to lower the complexity of construction and operation for plants for performance of the process since at least the temperature, and possibly also the pressure, is relatively low. This also has the result that a lower level of safety measures is required.

Increasing the pressure, via an increased mass flow rate of the reduction gas, has the effect of a possible increase in throughput for the same reactor area, or a possible reduction in reactor area for the same throughput.

However, planned elevated pressure can make higher demands on design and safety technology in the reduction unit.

The process of the invention is preferably performed at a temperature between the limits of 773 K and 1173 K, these limits being inclusive. This reduces the risk of sticking of the particles within the fluidized bed to an undesirable degree, which would present problems at higher temperatures.

Below 773 K, the reduction, for thermodynamic and kinetic reasons, does not proceed to a satisfactory degree for an economic process regime.

For example, the oxidic iron-bearing particles are preheated and introduced into the fluidized bed at a temperature of up to 1173 K, and the reduction gas is introduced into the fluidized bed at a temperature of up to 1023 K. The reduction with hydrogen $H_2$ proceeds endothermically, such that the reduction product is obtained at a lower temperature, for example of about 853 K.

Instead of or in addition to preheating outside the fluidized bed, it would also be possible to adjust the ratio of reducing components that react exothermically—for example carbon monoxide CO—to reducing components that react endothermically—for example hydrogen $H_2$— in the reduction gas such that heat is supplied to the desired degree in situ in the fluidized bed.

The process of the invention is preferably performed under a slightly elevated pressure compared to the environment. At a slightly elevated pressure, on the one hand, there is still no need for any additional safety complexity in terms of apparatus construction compared to a process regime at ambient pressure, and on the other hand risks resulting from ingress of ambient air into the reactors are reduced. The elevated pressure is preferably up to 200 000 pascal inclusive.

In an advantageous variant, $d_{30}$ is not more than 110 micrometers for the oxidic iron-bearing particles introduced into the fluidized bed. The fluidized bed can be operated particularly efficiently within this range since the discharge of fine oxidic iron-bearing particles is not unfavorably high, and the fluidization of the fluidized bed is not made difficult by large particle sizes.

In an advantageous variant, the process of the invention is conducted in such a way that the oxidic iron-bearing particles introduced into the fluidized bed are between 15 micrometers and 100 micrometers inclusive to an extent of at least 50% by mass.

Within this range, the fluidized bed can be operated particularly efficiently since the discharge of fine oxidic iron-bearing particles is not unfavorably high, and the fluidization of the fluidized bed is not made difficult by large particle sizes.

In a further advantageous variant, the process of the invention is performed in such a way that the oxidic iron-bearing particles introduced into the fluidized bed have a particle size of not less than 15 micrometers to an extent of at least 50% by mass. Within this range, the fluidized bed can be operated particularly efficiently since the discharge of fine oxidic iron-bearing particles is not unfavorably high.

The finer the oxidic iron-bearing particles, the greater the complexity necessary for dedusting of used reduction gas on account of an elevated discharge of dust. Furthermore, the fluidized bed itself can be less stable and more difficult to control with decreasing size of the iron-bearing particles. The oxidic iron-bearing particles are preferably present at less than 10 micrometers μm with proportions of not more than 30% by mass. The process can be efficiently controlled at least up to this fineness of the oxidic iron-bearing particles.

The fluidized bed may also have different zones with different bed heights. In general, in the case of oxidic iron-bearing particles, on account of the presence of iron in various oxidation states, reduction is effected in multiple stages by intermediates—for example magnetite via hematite to wuestite. For morphological, thermodynamic and kinetic reasons, there is a difference in optimal values for particle dwell time and gas dwell time for the various stages or intermediates. Different intermediates are present in different concentrations in different zones of the fluidized bed in the process regime of the invention in crosscurrent. Zones of the fluidized bed mean regions along the extent from the input site to the withdrawal site. It is therefore advantageous when establishment of different bed heights is possible in different zones of the fluidized bed. For instance, for different zones, particle dwell time and gas dwell time may be adapted appropriately by adjusting the bed height. This is possible, for example, by means of weirs, or by means of different dimensions of zones of the reactor space by which the fluidized bed is bounded.

The bed height in the fluidized bed is preferably 0.1-0.5 m, more preferably 0.3-0.4 m. It is thus possible, in the process regime of the invention, to achieve sufficient gas dwell times and particle dwell times in the reduction of oxidic iron-bearing particles. The proportion of unused reducing agent in the spent reduction gas is within an economically acceptable range when the fluidized bed has a bed height between 0.1-0.5 meter, with said range including 0.1 and 0.5.

The gas dwell time of the reduction gas in the fluidized bed is preferably 0.1 second to 10 seconds, more preferably 1 s-2 s. When the reduction gas dwells in the fluidized bed for between 1 and 2 seconds—with 1 and 2 being encompassed by the respective range—oxygen degradation is possible even close to the equilibrium, and the proportion of unused reducing agent in the spent reduction gas is then within a range of particularly good economic acceptability.

This is because the aim, in passage through the fluidized bed, is to consume a maximum amount of reducing agent. The less reducing agent is consumed, the more reduction gas has to be introduced into the fluidized bed for a given amount of oxidic iron-bearing particles, or the greater the cost and inconvenience involved in recirculating unused reducing agents.

In the process regime of the invention with regard to bed height and/or gas dwell time, it is also found, surprisingly, that there is barely any significant increase in conversion of matter owing to elevated pressure of the reduction gas, and this can lead to a rise in the proportion of unused reducing agent in the spent reduction gas.

It is accordingly possible to work at atmospheric pressure or slightly elevated pressure in a manner which conserves resources and is advantageous for safety purposes, without sacrificing notable increases in conversion of matter.

Preference is given to recirculating spent reduction gas exiting from the fluidized bed, after processing, back into the fluidized bed as a component of the reduction gas. This makes the process more economic. The hydrogen component of the reduction gas makes recirculation in the reduction of oxidic iron-bearing particles very simple, since all that has to take place in this regard, aside from a separation of dust that may be necessary, is a separation of the water reaction product, $H_2O$.

In an advantageous execution variant, fluidized bed is supplied with the same reduction gas throughout; no matter whether based on composition, or based on temperature, or based on pressure, or based on two or all three of these parameters. This makes the process simple to control, and reduces plant-related complexity.

In another advantageous execution variant, different zones of the fluidized bed are supplied with different reduction gas—for example mixtures of two or more components in different ratios, i.e. reduction gas of different composition in each case; this may be reduction gas at different temperature in each case, or reduction gas at different pressure in each case; or reduction gases that are different with regard to two or all three of these parameters. This is possible when the fluidized bed has different zones. In this way, it is possible to react to the presence of intermediates of different reactivity in different zones with reduction gases of different reactivity.

An apparatus for performance of the process of the invention may be executed as described hereinafter. It comprises a fluidized bed reactor suitable for guiding of particles and reduction gas in crosscurrent within a reactor space with distributor trays for formation of the fluidized bed. The reactor space has at least one entry opening for oxidic iron-bearing particles and at least one withdrawal opening for reaction product from the reactor space. The apparatus also comprises at least one reduction gas supply conduit for supply of reduction gas to the distributor tray, and at least one reduction gas removal conduit for removal of spent reduction gas from the reactor space.

"A" should be understood as the indefinite article in the expression "in a reactor space".

The reactor space may be divided into multiple zones along its extent from the entry opening to the withdrawal opening. This can be effected, for example, by means of preferably adjustable weirs that prevent crossmixing of the particles from adjacent zones—viewed from the entry opening to the withdrawal opening—and permit controlled establishment of zones having different bed heights. This can also be implemented in that the fluidized bed reactor comprises multiple subreactors, the respective subreactor spaces of which each form individual zones. The sum total of the subreactors is the fluidized bed reactor, and the sum total of the subreactor spaces is the reactor space of the fluidized bed reactor. The subreactor spaces may also be divided into multiple zones.

In one execution variant, the individual zones may have different dimensions in the horizontal and/or in the vertical—such that the fluidized bed in each case is of different width, or different maximum bed heights are possible; in this way, with constant throughput, different bed heights are achievable in different zones.

In one variant, the fluidized bed reactor comprises—or if appropriate the subreactors comprise—multiple modules of the same kind. This permits inexpensive setup with prefabricated modules, and simple adjustment to different capacity demands.

The fluidized bed reactor preferably comprises multiple subreactors. These may be arranged in sequence and/or in parallel. They are preferably connected to one another via transfer devices. In operation, particles are transferred, for example, from one subreactor into the adjacent subreactor viewed in the direction from the entry opening to the withdrawal opening along the fluidized bed reactor by means of the transfer devices. The transfer devices are suitable for transferring particles without ingress of air into the subreactors or exit of gas.

Multiple subreactors are preferably stacked one on top of another. This reduces the space required for the layout of the apparatus for performance of the process of the invention. Particles flow under gravity from an upper entry opening to a lower withdrawal opening.

The distributor tray of the fluidized bed reactor is essentially horizontal. This includes any variance from the horizontal of up to 10°, preferably includes a variance up to 5°, and more preferably includes a variance of up to 2°. In the case of excessive variance from the horizontal, the bed height in the fluidized bed becomes inhomogeneous over the longitudinal extent of the fluidized bed from the input site to the withdrawal side, which has an adverse effect on the controllability of the particle dwell time.

The distributor tray of the fluidized bed reactor or of at least one subreactor is preferably inclined downward from the input opening toward the withdrawal opening. This simplifies the flow of the particles in crosscurrent, as known, for example, from pneumatic conveyors.

In one variant, each zone has a dedicated reduction gas feed conduit. In one variant, a dedicated reduction gas feed conduit opens into each subreactor. Preferably, these reduction gas feed conduits all come from a central conduit. The central conduit supplies reduction gas to the reduction gas feed conduits. The reduction gas supplied via the central conduit may, for example, be fresh reduction gas—i.e. reduction gas that has still never flowed through the fluid bed—or a mixture of fresh reduction gas and a recirculated reduction gas—reduction gas obtained from processing of spent reduction gas.

In one variant, each zone has a dedicated reduction gas removal conduit. In one variant, a dedicated reduction gas removal conduit comes from each subreactor. Preferably, all reduction gas removal conduits open into a collective removal conduit that opens into a gas processing plant. In the gas processing plant, the spent reduction gas is processed, for example dedusted and dried. The combination of all spent reduction gas exiting from the reaction space or its zones and/or subreactors facilitates recirculation thereof into the reduction process for the purpose of central processing.

The present application further provides a signal processing device with a machine-readable program code, characterized in that it has control commands for performance of a process of the invention. A further item of subject matter is a signal processing device for performance of the process as claimed in any of the claims.

The present application further provides a machine-readable program code for a signal processing device, characterized in that the program code has control commands that cause the signal processing device to perform a process of the invention. A further item of subject matter is a computer program product comprising commands for a signal processing device which, when the program for the signal processing device is executed, cause it to perform the process as claimed in any of the claims.

The present application further provides a storage medium having a machine-readable program code of the invention stored thereon. A further item of subject matter is a storage medium having a computer program stored thereon for performance of the process as claimed in any of the claims.

BRIEF DESCRIPTION OF THE DRAWINGS

The present invention is described by way of example hereinafter with reference to multiple schematic figures.

DETAILED DESCRIPTION

Figure 1:
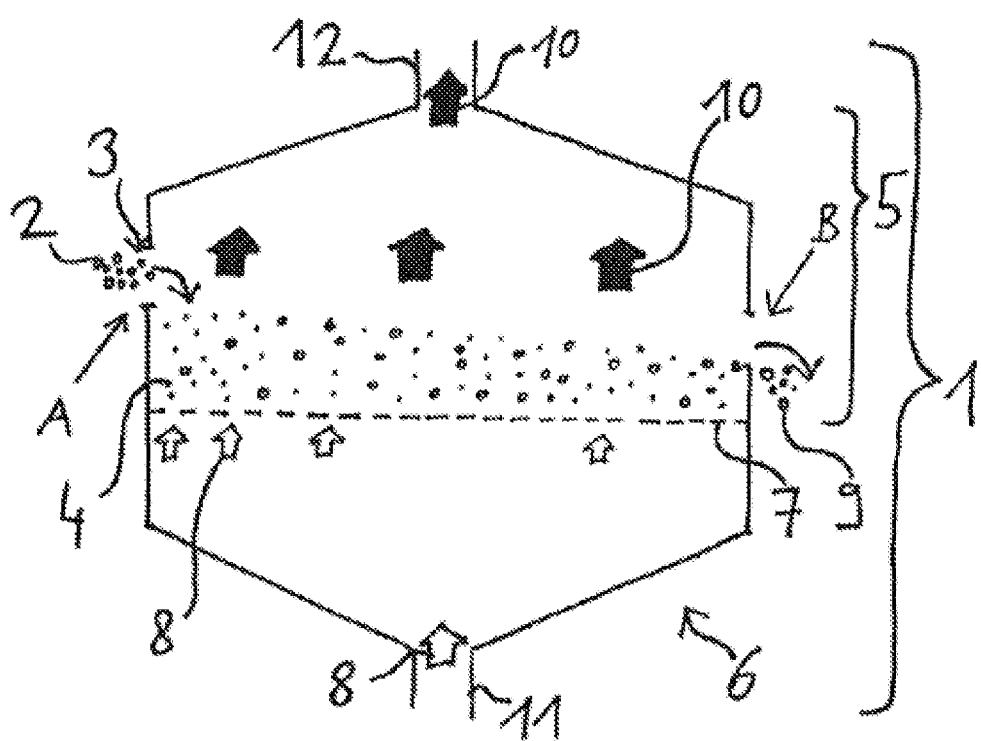
FIG. 1 shows the performance of a process of the invention in a section through a schematic reaction chamber.

FIG. 1 shows a schematic of one embodiment of the process of the invention. The process is performed in the apparatus 1. Oxidic iron-bearing particles 2 having a particle size of not more than 200 µm to an extent of at least 90% by mass, at input site A, are introduced continuously through input opening 3 into a fluidized bed 4 in the reactor space 5 of a fluidized bed reactor 6, which is indicated by an arrow. In one variant, up to 30% by mass of the oxidic iron-bearing particles may be smaller than 15 µm. The fluidized bed 4 is formed in the reactor space 5 in that particles are lifted counter to gravity by a reduction gas 8 that flows in from the bottom through a distributor tray 7—illustrated by unfilled block arrows. In the example shown, the same reduction gas 8 is supplied throughout. The distributor tray 7 is indicated by gaps in the lower outline of the reactor space 5; for better clarity, not every gap has its own block arrow, and not all block arrows have been given the reference numeral 8. Iron oxides in the oxidic iron-bearing particles 2 are reduced to the reduction product 9 by the reduction gas 8. Reduction gas 10 consumed by the reduction of the iron oxides in the oxidic iron-bearing particles—represented by filled block arrows—exits from the fluidized bed 4 at the top. The reduction gas 8 consists, for example, of hydrogen $H_2$ of technical grade purity; correspondingly, the spent reduction gas 10 will contain, for example, water $H_2O$ and hydrogen, since not all the hydrogen flowing in at the bottom will be converted. Particles entrained upward out of the fluidized bed by the spent reduction gas 10 are not shown separately. At a withdrawal point B, the particles of the reduction product 9 are withdrawn continuously from the fluidized bed 4 in the reactor space 5, which is indicated by an arrow. The reduction gas 8 is guided through the fluidized bed 4 in crosscurrent from the bottom upward at a velocity of more than 0.05 m/s. The temperature of the oxidic iron-bearing particles 2 introduced is 1173 K, for example, and the temperature of the incoming reduction gas 8 is 1023 K throughout. The reduction product 9 has a temperature, for example, of 853 K.

In the fluidized bed reactor 6 shown in schematic form in FIG. 1, there is preferably a slightly elevated pressure of 200 000 Pa relative to the environment.

The process shown can be conducted, for example, such that the bed height in the fluid bed 4 is 0.1-0.5 m, and/or the gas dwell time is 0.1-10 s, preferably 1-2 s.

The reduction gas 8 is supplied to the distributor tray 7 via the reduction gas feed conduit 11. The reduction gas feed conduit 12 serves to remove spent reduction gas 10 from the reactor space 5.

Figure 2:
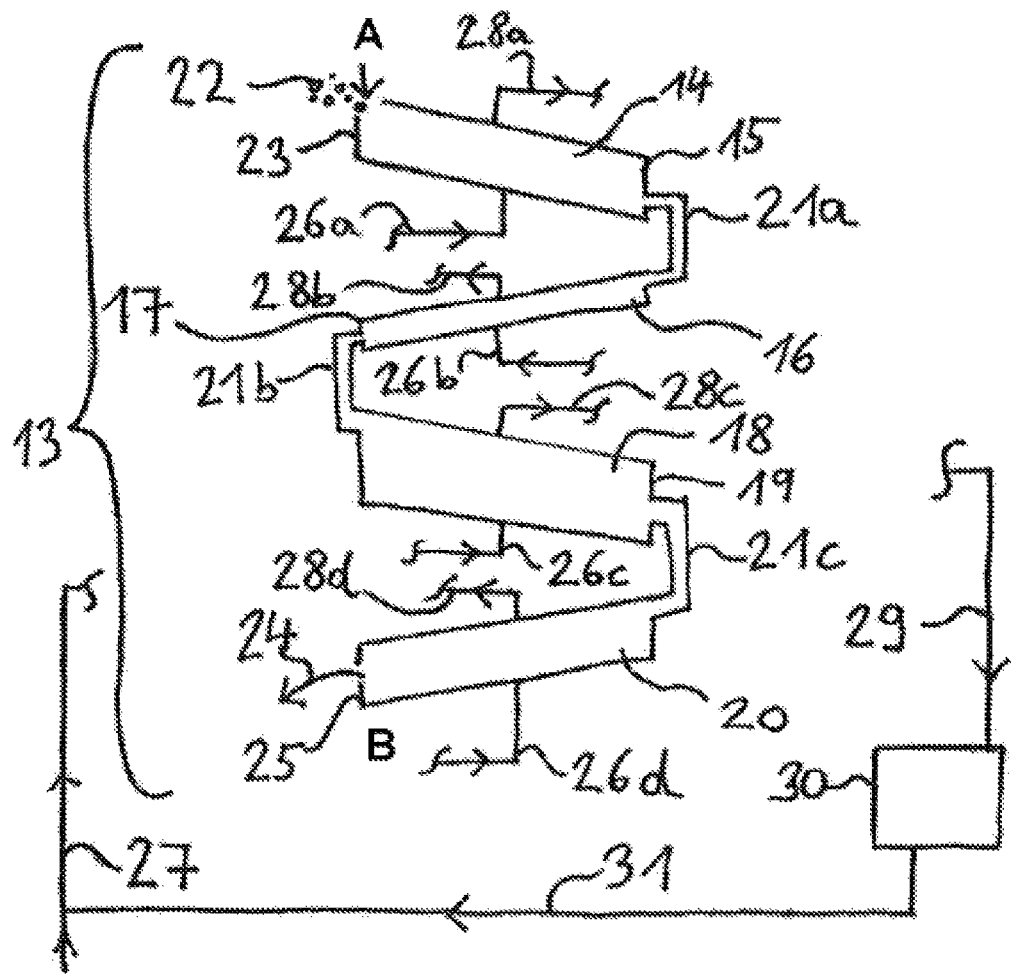
FIG. 2 shows a schematic of an arrangement with multiple subreactors.

FIG. 2 shows a schematic of an embodiment in which a fluidized bed reactor 13 comprises multiple subreactors 14, 16, 18, 20. The subreactors are connected sequentially to one another; subreactor 14 is connected at its end 15 to subreactor 16, which is itself connected at its end 17 to subreactor 18. Subreactor 18 is connected at its end 19 to subreactor 20. The connections are effected via transfer devices 21a, 21b, 21c. The input opening A for oxidic iron-bearing particles 22 is present at the start 23 of the subreactor 14; the withdrawal opening B for reaction product 24 is present at the end 25 of the subreactor 20. The intermediates from the reduction of the oxidic iron-bearing particles 22 to the reduction product 24 are transferred by the transfer devices 21a, 21b, 21c in each case from an upstream subreactor viewed in the direction from the input opening A along the fluid bed to the withdrawal opening B into the downstream subreactor. While the solid material within the fluid bed (not shown separately)—i.e. oxidic iron-bearing particles, particles of intermediates, and particles of reduction product—flows from the input opening A to the withdrawal opening B in the fluidized bed reactor 13 through the successive, i.e. sequentially interconnected, subreactors 14, 16, 18, 20, within the fluid bed (not shown separately)—i.e. oxidic iron-bearing particles, particles of intermediates, and particles of reduction product—it is subjected to a crossflow of reduction gas (not shown separately).

In the diagram of FIG. 2, the subreactors 14, 16, 18, 20 are stacked vertically one on top of another. They are executed with a slightly sloped base. Dedicated reduction gas feed conduits 26a, 26b, 26c, 26d open into each of the various subreactors 14, 16, 18, 20, all of which come from a central conduit 27—for better clarity, the connections thereof to central conduits 27 are not shown separately. Respective dedicated reduction gas removal conduits 28a, 28b, 28c, 28d exit from the various subreactors 14, 16, 18, 20, all of which open into a collective removal conduit 29—for better clarity, the connections thereof to the collective removal conduit 29 are not shown separately. The collective removal conduit 29 opens into a gas processing plant 30 in which spent reduction gas, for example, is dedusted and dried. By a recirculation conduit 31, the processing product—dedusted and dried hydrogen in the case of the example from FIG. 1—is sent to the central conduit 27, and hence recirculated into the process as a component of the reduction gas together with fresh hydrogen $H_2$ from other sources.

The fluidized bed in the fluidized bed reactor 13 has multiple zones—there is one zone in each subreactor 14, 16, 18, 20. By means of different dimensions of the subreactors 14, 16, 18, 20, shown schematically in FIG. 2 by different heights, the different zones of the fluidized bed each have different bed heights in a continuous process regime.

In one variant of the process of the invention, it would be possible to supply the different zones with different reduction gas; this variant is not shown separately.

For better clarity, there is no detailed description of the supply and production of fresh hydrogen $H_2$ from other sources.

Overall, temperature, pressure and composition of the reduction gas influence the reaction kinetics, which results in demands on gas dwell time and particle dwell time, and also bed height. The velocity of the reduction gas affects the extent of discharge from the fluidized bed and the amount of circulating reduction gas volume. Reaction kinetics and reduction gas velocity in turn affect the specific reaction area required.

Figure 3:
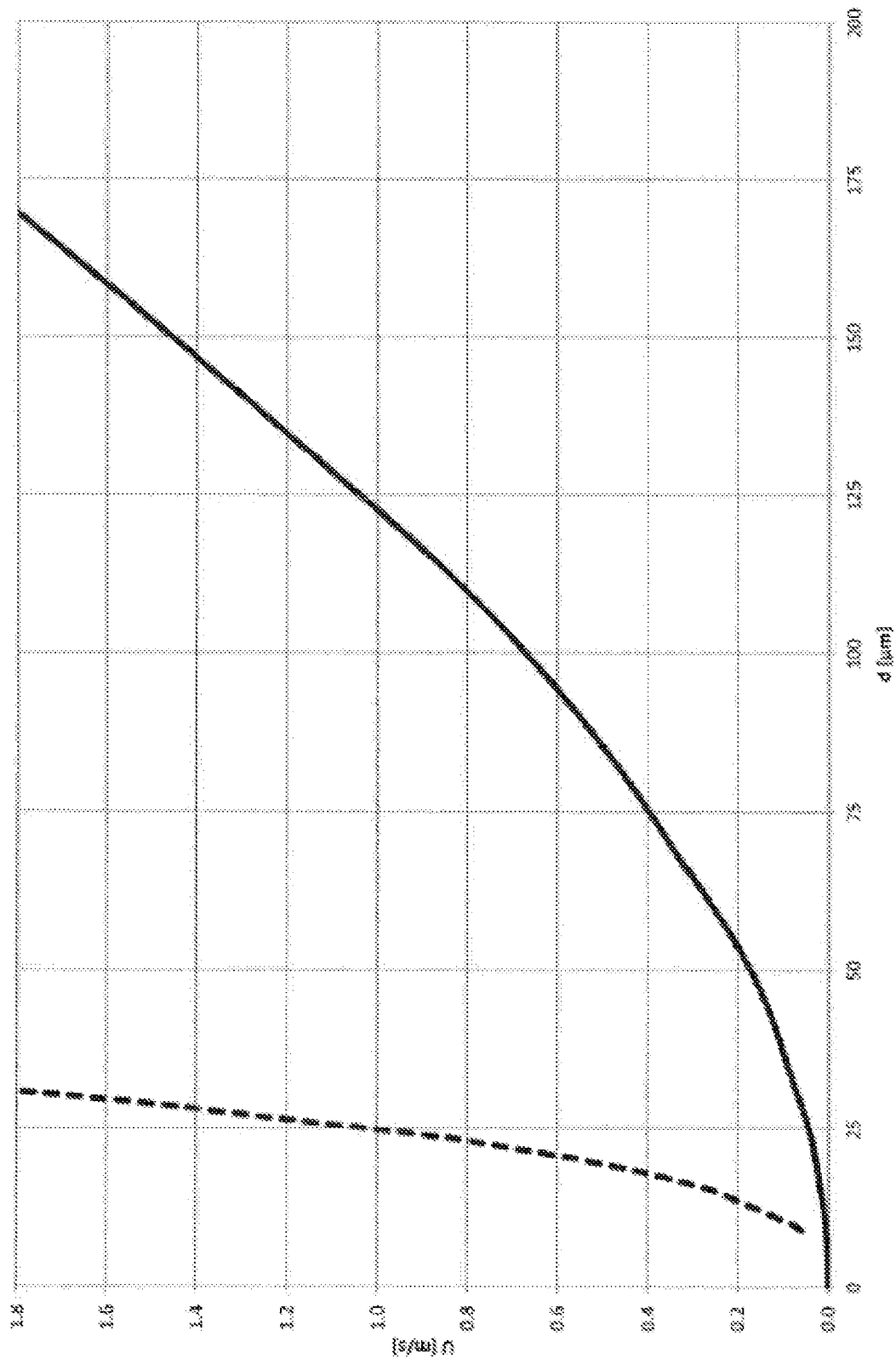
FIG. 3 shows the theoretical correlation of the prevailing teaching and the correlation discovered by the inventors between superficial velocity U and particle size d.

FIG. 3 shows, with a solid line, the value expected according to prevailing teaching for the theoretical fluidization velocity $U_t$ for various grain sizes d of spherical DRI/iron ore particles at 1023 K with hydrogen $H_2$ as reduction gas and an elevated pressure of 200 000 Pa:

$$U_t = \sqrt{\left(\frac{4}{3} * \frac{(\rho p - \rho g)}{\rho g} * \frac{d*g}{Cw}\right)}$$

$$\text{with } Cw = \frac{24}{Re} + \frac{4}{\sqrt{Re}} + 0.4$$

and with $$Re = \frac{\rho g * U_t * d}{\mu}$$

Likewise shown, by a dotted line, is the correlation between grain size d and fluidization velocity $U_{max}$ that is at variance with the prevailing teaching and follows $U_{max} = (40000*d)^{2.78}$.

The description of advantageous configurations of the invention given so far contains numerous features that are in some cases expressed with two or more together in the individual subsidiary claims. However, these features may appropriately also be considered individually and combined to give viable further combinations. More particularly, these features are each individually combinable, in any suitable combination, in a process of the invention.

Even if the description or the claims use some terms respectively in the singular or in conjunction with a numerical word, the scope of the invention for these terms shall not be limited to the singular or the respective numerical word. Moreover, the word "a" shall not be understood as "one", but as the indefinite article.

The properties, features and advantages of the invention as described, and the manner in which they are achieved, are elucidated in a clearer and more distinctly comprehensible manner in connection with the description of the working example(s) of the invention that are elucidated in detail in association with the drawings. The working example(s) serve(s) to elucidate the invention and do not limit the invention to the combinations of features specified therein, not even in relation to functional features. Moreover, suitable features for the purpose from any working example considered explicitly in isolation, removed from any working example, may be introduced into another working example for augmentation thereof and be combined with any of the claims.

Even though the invention has been elucidated in detail and described in detail by the preferred working example(s), the invention is not limited by the example(s) disclosed, and other variants may be derived therefrom without leaving the scope of protection of the invention.

LIST OF REFERENCE NUMERALS

1 Apparatus for performance of a process of the invention
2 Oxidic iron-bearing particles
3 Input opening
4 Fluidized bed
5 Reactor space
6 Fluidized bed reactor
7 Distributor tray
8 Reduction gas
9 Reduction product
10 Spent reduction gas
11 Reduction gas feed conduit
12 Reduction gas removal conduit
13 Fluidized bed reactor
14 Subreactor
15 End
16 Subreactor
17 End
18 Subreactor
19 End
20 Subreactor
21a,21b,21c Transfer devices
22 Iron-bearing particles
23 Start
24 Reaction product
25 End
26a,26b,26c,26d Reduction gas feed conduits
27 Central conduit
28a,28b,28c,28d Reduction gas removal conduits
29 Collective removal conduit
30 Gas processing plant
31 Recirculation conduit

The invention claimed is:

1. A process of direct reduction of oxidic iron-bearing particles to a reduction product in a fluidized bed, comprising:
flowing continuously the oxidic iron-bearing particles horizontally through the fluidized bed; and
flowing in crosscurrent a reduction gas containing 30-100 mol % of hydrogen $H_2$ through the fluidized bed;
wherein the oxidic iron-bearing particles introduced into the fluidized bed have a grain size of not more than 200 micrometers to an extent of at least 90% by mass;
wherein a superficial velocity U of the reduction gas flowing through the fluidized bed is set between 0.05 m/s and 1 m/s such that it is above the theoretical fluidization velocity $U_t$ and not more than $U_{max}$ for the grain size $d=d_{30}$ of the oxidic iron-bearing particles introduced into the fluidized bed;
wherein a theoretically predicted value $U_t$ for a grain size d is found from:

$$U_t = \sqrt{\left(\frac{4}{3} * \frac{(\rho p - \rho g)}{\rho g} * \frac{d*g}{Cw}\right)}$$

$$\text{with } Cw = \frac{24}{Re} + \frac{4}{\sqrt{Re}} + 0.4$$

and with $$Re = \frac{\rho g * U_t * d}{\mu};$$

wherein $U_{max}$ is calculated from an actual correlation found between particle size and fluidization velocity for a particle size $d=d_{30}$:

$$U_{max} = (40000*d)^{2.78}; \text{ and}$$

wherein $U_t$ is a theoretical fluidization velocity in m/s, $U_{max}$ is a maximum superficial velocity for $d=d_{30}$ in m/s, $\rho p$ is a particle density in kg/m$^3$, $\rho g$ is a density of the reduction gas in kg/m$^3$ for a state of operation, d is a grain size in meters, g is an acceleration due to gravity in m/s$^2$, $\mu$ is a dynamic viscosity in kg/(m*s), Cw is a coefficient of resistance, and Re is a Reynolds number.

2. The process as claimed in claim 1, wherein the process is conducted at a temperature between 773 K and 1123 K.

3. The process as claimed in claim 1, wherein the process is conducted under a slightly elevated pressure compared to the environment.

4. The process as claimed in claim 1, wherein $d_{30}$ is not more than 110 micrometers for the oxidic iron-bearing particles introduced into the fluidized bed.

5. The process as claimed in claim 1, wherein the oxidic iron-bearing particles introduced into the fluidized bed are between 15 micrometers and 100 micrometers to an extent of at least 50% by mass.

6. The process as claimed in claim 1, wherein the oxidic iron-bearing particles are present at smaller than 10 micrometers with fractions of not more than 30% by mass.

7. The process as claimed in claim 1, wherein the fluidized bed has different zones with different bed heights.

8. The process as claimed in claim 1, wherein the bed height in the fluidized bed is 0.1-0.5 m.

9. The process as claimed in claim 8, wherein the bed height in the fluidized bed is 0.3-0.4 m.

10. The process as claimed in claim 1, wherein a gas dwell time of the reduction gas in the fluidized bed is 0.1 second to 10 seconds.

11. The process as claimed in claim 10, wherein the gas dwell time of the reduction gas in the fluidized bed is 1 second to 2 seconds.

12. The process as claimed in claim 1, wherein spent reduction gas exiting from the fluidized bed, after processing, is recirculated again into the fluidized bed as a component of the reduction gas.

13. The process as claimed in claim 1, wherein the fluidized bed is supplied with the same reduction gas throughout.

14. The process as claimed in claim 1, wherein different zones of the fluidized bed are supplied with different reduction gases.

15. The process as claimed in claim 1, wherein the crosscurrent is with respect to the oxidic iron-bearing particles.

16. The process as claimed in claim 1, wherein the reduction gas flows vertically from bottom to top through the fluidized bed.

17. A process of direct reduction of oxidic iron-bearing particles to a reduction product in a fluidized bed, comprising:
   flowing continuously the oxidic iron-bearing particles horizontally through the fluidized bed;
   flowing in crosscurrent a reduction gas containing 30-100 mol % of hydrogen $H_2$ through the fluidized bed;
   limiting a grain size of the oxidic iron-bearing particles introduced into the fluidized bed to not more than 200 micrometers to an extent of at least 90% by mass; and
   setting a superficial velocity U of the reduction gas flowing through the fluidized bed to between 0.05 m/s and 1 m/s such that it is above the theoretical fluidization velocity $U_t$ and not more than $U_{max}$ for the grain size $d=d_{30}$ of the oxidic iron-bearing particles introduced into the fluidized bed;
   wherein a theoretically predicted value $U_t$ for a grain size d is found from:

$$U_t = \sqrt{\left(\frac{4}{3} * \frac{(\rho p - \rho g)}{\rho g} * \frac{d * g}{Cw}\right)}$$

with $Cw = \dfrac{24}{Re} + \dfrac{4}{\sqrt{Re}} + 0.4$ and with $$Re = \frac{\rho g * U_t * d}{\mu};$$

wherein $U_{max}$ is calculated from an actual correlation found between particle size and fluidization velocity for a particle size $d=d_{30}$:
   $U_{max} = (40000*d)^{2.78}$; and
   wherein $U_t$ is a theoretical fluidization velocity in m/s, $U_{max}$ is a maximum superficial velocity for $d=d_{30}$ in m/s, $\rho p$ is a particle density in kg/m³, $\mu g$ is a density of the reduction gas in kg/m³ for a state of operation, d is a grain size in meters, g is an acceleration due to gravity in m/s², $\mu$ is a dynamic viscosity in kg/(m*s), Cw is a coefficient of resistance, and Re is a Reynolds number.

18. The process as claimed in claim 17, wherein the crosscurrent is with respect to the oxidic iron-bearing particles.

19. The process as claimed in claim 17, wherein the reduction gas flows vertically from bottom to top through the fluidized bed.

* * * * *